United States Patent [19]

Wang

[11] Patent Number: 4,529,502

[45] Date of Patent: Jul. 16, 1985

[54] SULFUR OXIDE ACCEPTANCE FROM A FLUE GAS

[75] Inventor: Li Wang, Westmont, Ill.

[73] Assignee: UOP Inc., Des Plaines, Ill.

[21] Appl. No.: 584,024

[22] Filed: Feb. 27, 1984

[51] Int. Cl.$^3$ .................. C10G 11/00; B01D 15/06
[52] U.S. Cl. ............................. 208/164; 208/113; 423/244
[58] Field of Search ............... 208/113, 164; 423/244 A

[56] References Cited

U.S. PATENT DOCUMENTS

| | | | |
|---|---|---|---|
| 3,725,531 | 4/1973 | Pearson et al. | 422/244 A |
| 3,835,031 | 9/1974 | Bertolacini et al. | 208/113 |
| 4,071,436 | 1/1978 | Blanton, Jr. et al. | 208/120 |
| 4,146,463 | 3/1979 | Radford et al. | 208/120 |
| 4,153,535 | 5/1979 | Vasalos et al. | 208/164 |
| 4,206,039 | 6/1980 | Vasalos | 208/164 |
| 4,240,899 | 12/1980 | Gladrow et al. | 208/120 |
| 4,325,811 | 4/1982 | Sorrentino | 208/113 |
| 4,369,108 | 1/1983 | Bertolacini et al. | 423/244 A |
| 4,405,443 | 9/1983 | Bertolacini et al. | 208/113 |

Primary Examiner—D. E. Gantz
Assistant Examiner—Cynthia A. Prezlock
Attorney, Agent, or Firm—Thomas K. McBride; William H. Page, II; Louis A. Morris

[57] ABSTRACT

A process for removing sulfur oxides from a gas by the steps comprising:
(a) contacting said gas with an acceptor at acceptance conditions which reacts with and retains said sulfur oxides, said acceptor comprising calcium oxide deposited on an aluminum oxide or magnesium oxide and aluminum oxide support so as to provide essentially a single complete monolayer of calcium on said support, and (b) removing said retained sulfur oxides from the acceptor by contacting the acceptor with a reducing gas comprising hydrogen at reduction conditions.

The process has particular utility in the FCC process in which the acceptor may be circulated with the FCC catalyst.

8 Claims, No Drawings

SULFUR OXIDE ACCEPTANCE FROM A FLUE GAS

BACKGROUND OF THE INVENTION

1. Field of the Invention

The field of art to which the claimed invention pertains is the removal of sulfur oxide from a gas, particularly an FCC flue gas.

2. Background Information

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process for the conversion of relatively high boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

Due to the ever increasing concern about air pollution, great efforts have been expended in recent years toward the development of processes to reduce the pollutants introduced into the atmosphere from various industrial operations. One of the most onerous of these pollutants is sulfur dioxide which is present in the stacks of flue gases from various operations. In one such operation, the fluidized catalytic cracking (FCC) process, sulfur compounds contained in the hydrocarbon feedstock result in sulfur-containing material to be deposited on the FCC catalyst along with the carbonaceous material and thereby cause the generation of sulfur dioxide in the FCC regeneration section when the sulfur is burned off the catalyst along with the carbon deposits. This sulfur dioxide becomes a part of the regenerator flue gas and thus a pollutant when the flue gas eventually finds its way into the atmosphere.

There are many methods known to the art for removal of sulfur dioxide from stack or flue gases. There is, for example, the wet scrubbing process in which the sulfur dioxide reacts with an appropriate reactant contained in an aqueous solution or slurry sprayed into the flue gas, the sulfur thereby being removed from the system as a compound contained in the liquid phase. In another process the flue gas is passed through a fixed solid bed containing a sulfur "acceptor" with which the sulfur dioxide reacts and on which the sulfur is retained in the sulfate form, thereby being removed from the flue gas.

A prior art process for removal of sulfur dioxide from FCC flue gas highly pertinent to the present invention is that disclosed in U.S. Pat. No. 4,071,436 to Blanton, Jr., et al. In this process alumina particles are in admixture with the FCC catalyst and are circulated therewith throughout the reactor-regenerator circuit. In the regenerator the alumina reacts with sulfur dioxide to form a solid compound, which when circulated to the reactor reacts with hydrocarbons in the feedstock in the reducing environment to release the sulfur, supposedly as hydrogen sulfide. The sulfur is thereby dealt with in the FCC facilities downstream of the reactor section instead of as part of the regenerator flue gas. This reference states that it is preferred that materials such as calcium not be present in the particulate solid used for removal of the sulfur dioxide, since they simply form a noncyclical sulfur-containing solid.

U.S. Pat. No. 4,146,463 to Radford et al. discloses very broadly sulfur oxide acceptors which might be incorporated with FCC catalyst or circulated as separate particles. Among the many possibilities, this reference teaches calcium deposited on alumina as a sulfur oxide acceptor. There is no recognition in this reference, however, of the criticality of the amount and nature of such deposition. Specifically, with regard to Group IIA metals, this reference teaches very broad ranges for the amount of metal oxides which may be deposited, i.e., 25 ppm—7% as the broadest preferred range with 0.1%–0.5% as the most preferred. There is no hint in this reference to the desirability of a single complete monolayer of the deposited metal oxide on the support.

U.S. Pat. No. 4,325,811 to Sorrentino teaches the use of a separate reduction zone in a process such as that in Radford et al. in which the absorbed sulfur oxides are released from the acceptor particles. The process conditions in the reducing zone can be independently adjusted so as to optimize the removal of the sulfur oxides.

It is also known in the art that an FCC catalyst contaminated with metals such as nickel or iron from the hydrocarbon feedstock may be very effectively passivated by contacting the catalyst with a light hydrocarbon gas and hydrogen mixture at passivation reaction conditions prior to recycling the catalyst to the reactor. The passivation reaction involves the contaminating metals and serves to minimize their undesirable catalytic activity in the reaction zone. The passivation reaction is preferably carried out in a passivation reaction zone comprising a vessel in the dipleg line between the regeneration vessel and the reactor riser.

The present invention is based on the discovery of the surprising effectiveness of a sulfur oxide acceptor comprising a single complete monolayer of calcium oxide deposited on an aluminum oxide or aluminum oxide and magnesium oxide support.

SUMMARY OF THE INVENTION

In brief summary, the present invention is a process for removing sulfur oxides from a gas which comprises contacting the gas with an acceptor at acceptance conditions which reacts with and retains the sulfur oxides. The acceptor comprises calcium oxide deposited on an aluminum oxide or magnesium oxide and aluminum oxide support so as to provide essentially a single complete monolayer of calcium on the support. The retained sulfur oxides are removed from the acceptor by contacting the acceptor with a reducing gas comprising hyrogen at reduction conditions.

Other embodiments of the invention encompass details about acceptor composition, flow schemes and reaction conditions, all of which are hereinafter disclosed in the following discussion of each of the facets of the invention.

DESCRIPTION OF THE INVENTION

I have made the surprising and unexpected discovery, with regard to the performance of a sulfur oxide acceptor comprising calcium oxide deposited on an aluminum oxide or aluminum oxide and magnesium oxide support, of the criticality of having a single complete monolayer of the calcium oxide on the support. I have found that when the monolayer is less than complete, reduction of the sulfur-containing acceptor with hydrogen will produce less of the desirable hydrogen sulfide gas as opposed to the much less desirable free sulfur or sulfur dioxide. On the other hand, if the calcium oxide is deposited in excess of a single monolayer, the acceptance ability of the acceptor will be diminished.

It is important to avoid the production of free sulfur or sulfur dioxide in the course of reducing or regenerating acceptors. Free sulfur would have the tendency to plug the process equipment and the production of sulfur dioxide would, of course, defeat the purpose of the sulfur oxide removal from the gas. The high purity hydrogen sulfide obtained by the process of the present invention may be disposed of in many ways, including direct sale as a valuable industrial chemical.

The degree to which a calcium oxide monolayer on the support is achieved may be quantitized by the expression:

$$\theta_{ca} = M_{ca}/M_o$$

where $\theta_{ca}$ = fraction of the support surface area covered by the calcium oxide;

$M_{ca}$ = number of calcium oxide molecules present per unit weight of the base;

$M_o$ = number of calcium oxide molecules required for a monolayer coverage per unit weight of the base (varies with the support used and is a function of the surface area of that support).

If $\theta_{ca}$ is exactly equal to 1.0 the exact quantity of calcium oxide required for a monolayer will be present. If the proper technique for depositing the calcium oxide has been used, as will hereinafter be discussed, such quantity will have been uniformly and evenly dispersed over the support so as to achieve the monolayer.

The deposition of the calcium oxide on the support to achieve the above result is best effected by the well-known evaporative impregnating technique. In that technique the support is immersed in an appropriate amount and concentration of an aqueous solution of a calcium salt and the water is removed by evaporation. A rotary steam jacketed evaporator is ideal for that purpose. The impregnated support may then be removed from the evaporator, further dried and finally calcined so as to convert the calcium to its oxide form.

The composition of the support material may comprise alumina ($Al_2O_3$) or alumina and magnesia (MgO). These oxides or mixtures thereof are most conveniently prepared by the gelation of sol precursors followed by drying and calcining. If the support comprises the oxide mixture, the weight ratio of magnesium oxide to aluminum oxide should be from about 0.15:1.0 to about 0.50:1.0.

Without being limited to any particular theory, my hypothesis as to why it is critical not to impregnate more than one monolayer of calcium compound is as set forth in the following reaction scheme where chemical equations are presented to represent the reactions which are hypothesized to occur in both the situations where one monolayer is not exceeded, and the situation where it is exceeded.

| $SO_2$ acceptance phase | (1) not more than one monolayer ($\theta ca \leq 1.0$) <br> $(CaO)-Al + SO_2 + O_2 \rightarrow (CaSO_x)-Al$ <br> (2) in excess of one monolayer ($\theta ca > 1.0$) <br> $CaO + SO_2 + O_2 \rightarrow CaSO_4$ | |
|---|---|---|
| reduction phase | (3) $(CaSO_x)-Al + H_2 \rightarrow (CaO)-Al + H_2O + H_2S$ <br> (4) and $\rightarrow (CaS)-Al + H_2O$ <br> (5) $(CaS)-Al + H_2O \rightarrow (CaO)-Al + H_2S$ | $\theta ca \leq 1.0$ |
| | (6) $CaSO_4 + H_2 \rightarrow CaS + H_2O$ <br> (7) $CaS + H_2O \underset{\leftarrow}{\rightarrow} CaO + H_2S$ | $\theta ca > 1.0$ |
| following $SO_2$ acceptance | (8) $CaS + O_2 + SO_2 \rightarrow CaSO_4 + SO_2$ <br> (9) $CaSO_4 \rightarrow CaO + SO_2$ | |

It is believed in this scheme that the CaO in excess of a monolayer forms a segregated CaO phase, i.e., there is no interaction between the CaO and the aluminum in the support. CaO forms $CaSO_4$ upon reacting with $SO_2$ (eq. 2). $CaSO_4$ is then reduced to CaS (eq. 6) which is too stable to be hydrolyzed to $CaO+H_2S$, as shown by the equilibrium to the left (eq. 7). Thus most of the sulfur uptaken from the first acceptance remains on the acceptor as CaS. CaS is reoxidized into $CaSO_4$ (eq. 8) and partially decomposed into CaO and $SO_2$ (eq. 9). The $SO_2$ evolved from the decomposition of $CaSO_4$ plus the $SO_2$ present in the gas feed may surpass the acceptor acceptance ability and consequently some of the $SO_2$ may break through the acceptor bed. This explains the observation that there is always a small amount of $SO_2$ that escapes from the acceptor in the second and following acceptance cycles and the amounts of $SO_2$ which escapes is significantly higher for acceptors with $\theta ca$ greater that 1.0. The aluminum which apparently plays an important role with the acceptor used in the process of the present invention (eqs. 1, 3, 4 and 5), is simply not available when $\theta ca$ is greater than 1.0.

The process of the present invention would be particularly useful for treating the flue gas from a fluid catalytic cracking unit (FCC) regenerator. It is not unusual for such flue gas to be high in sulfur oxide content due to the high sulfur content frequently found in low quality, high sulfur FCC feedstocks, the use of which is becoming increasingly common. Associating the process of the present invention with the FCC process would have the further advantage that a source of reducing hydrogen would be readily available since hydrogen is one of the FCC reaction products and could be supplied from the standard FCC gas concentration or treatment facilities in a quantity and purity quite adequate for use in the process of the present invention. Such hydrogen would be supplied as a mixture of light hydrocarbon gas and hydrogen.

Charge stocks used in the catalytic cracking process also commonly contain contaminant metals such as nickel, iron, cobalt and vanadium found in the charge stock which usually influence the regeneration operation, catalyst selectivity, catalyst activity and the fresh catalyst makeup rate required to maintain a constant activity. Metals contained in the feed are deposited on the catalyst and not only change its selectivity in the direction of less gasoline and more coke and light gas in a given reactor system but tend to deactivate the catalyst. Beneficial effects of this invention are also realized in passivating these metals for FCC units processing heavy or residual charge stocks, i.e., those boiling above 900° F., which frequently have a high metals content.

In a typical FCC process flow, finely divided regenerated catalyst leaves the regeneration zone at a certain temperature and contacts a feedstock in a lower portion of a reactor riser zone. While the resulting mixture, which has a temperature of from about 200° C. to about 700° C., passes up through the riser, conversion of the feed to lighter products occurs and coke is deposited on the catalyst. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separate hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, contacts the spent catalyst purging adsorbed and interstitial hydrocarbons from the catalyst. The spent catalyst containing coke leaves the stripping zone and passes into a regeneration zone, where, in the presence of fresh regeneration gas and at a temperature of from about 540° C. to about 760° C., a combustion of coke produces regenerated catalyst and flue gas containing carbon monoxide, carbon dioxide, water, nitrogen and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, which is the preferred mode of operation, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and, as previously mentioned, contacts the feedstock in the reaction zone.

The sulfur problem in the FCC process is concerned primarily with the carry-over of sulfur moieties into the regenerator with the coked catalyst resulting in increased emissions of sulfur oxide with the flue gas. In recent years several concepts have been proposed for reducing sulfur oxide emission from the catalyst regenerator. The most viable concept is as that disclosed as aforementioned in U.S. Pat. No. 4,071,436 to Blanton, Jr., et al. which involves the addition of sulfur oxide "acceptors" to the catalyst wherein the acceptor species is converted to a sulfate in the regenerator environment and subsequently converted back to an oxide form in the reactor riser with the concomitant release of sulfur in the form of hydrogen sulfide. This procedure is claimed to be reasonably effective and practical. The separate reducing zone as taught in U.S. Pat. No. 4,325,811 to Sorrentino adds further flexibility and effectiveness to the process.

In the preferred FCC embodiment of the present invention, particles of the acceptor are physically admixed with the FCC catalyst and react with sulfur oxides in the regenerator to form the spent sulfur-containing acceptor. The spent acceptor is freed from the sulfur and renewed by withdrawing the acceptor and catalyst from the regeneration zone and treating the acceptor in the acceptor renewal zone by contacting it with a reducing gas comprising hydrogen at reducing conditions, whereby the sulfur becomes dissociated from the acceptor, and then recirculating the catalyst and acceptor to the cracking zone. The preferred acceptance conditions of the process of the present invention would comprise a temperature from about 540° C. to about 760° C. which would encompass typical FCC regenerator operating temperatures. The reduction temperature which could easily be maintained in an acceptor renewal zone, would preferably be at least about 730° C. The renewal zone would most conveniently comprise a vessel in the dipleg line between the regeneration vessel and the reactor riser.

The following nonlimiting example is presented to illustrate the capability of the process of the present invention to achieve acceptance of $SO_2$ from a gas, to release the retained sulfur in the course of reduction with hydrogen in the desirable form of $H_2S$ and the criticality of $\theta ca$ being equal to about 1.0 (essentially a single complete monolayer of calcium oxide being on the support).

EXAMPLE

A series of sulfur oxide acceptors was prepared, including acceptors having the composition required by the present invention and acceptors not having such composition. In all cases the salt of the added metal, i.e., calcium in most cases, was deposited on the alumina or alumina and magnesia support by impregnation. The supports were obtained by the gelling or co-gelling of alumina or alumina/magnesia sols, followed by drying and calcining the gels. The attached table summarizes the compositions of the above acceptors as well as their performance when used to remove sulfur dioxide from a typical flue gas at 730° C. followed by reduction with hydrogen at 730° C.

TABLE

| Acceptor No. | Support | Surface Area of Base (m²/g) | % mg | % Ca | θ Ca | Acceptance | % H₂S | % Sx | % SO₂ | % S on Spent Acceptor |
|---|---|---|---|---|---|---|---|---|---|---|
| 1 | MgO.Al₂O₃ | 112 | 15.6 | 1.3 | 0.24 | 98 | 65.8 | 31.0 | 3.2 | 0.15 |
| 2 | MgO.Al₂O₃ | 112 | 15.6 | 3.0 | 0.57 | 99.4 | 79.1 | 20.0 | 0.9 | 0.30 |
| 3 | MgO.Al₂O₃ | 112 | 15.6 | 5.2 | 1.00 | 97.5 | 87.5 | 12.5 | 0 | — |
| 4 | MgO.Al₂O₃ | 159 | 9.4 | 6.0 | 0.83 | 99.8 | 74.9 | 24.6 | 0.5 | 0.24 |
| 5 | MgO.Al₂O₃ | 159 | 9.4 | 9.0 | 1.28 | 96.9 | 90.5 | 9.5 | 0 | 0.67 |
| 6 | MgO.Al₂O₃ | 126 | 17.4 | 4.6 | 0.79 | 99.4 | 83.9 | 16.1 | 0 | 0.39 |
| 7 | MgO.Al₂O₃ | 126 | 17.4 | 6.0 | 1.04 | 97.1 | 86.3 | 13.7 | 0 | 1.61 |
| 8 | MgO.Al₂O₃ | 73 | 15.5 | 5.0 | 1.49 | 94.7 | 92.5 | 7.5 | 0 | 0.90 |
| 9 | MgO.Al₂O₃ | 73 | 15.5 | 6.0 | 1.80 | 88.9 | 91.2 | 8.8 | 0 | 1.27 |
| 10 | MgO.Al₂O₃ | 127 | 13.0 | 4.0 | 0.68 | 99.7 | 74.4 | 23.6 | 2.0 | 0.19 |
| 11 | MgO.Al₂O₃ | 127 | 13.0 | 6.0 | 1.04 | 99.6 | 82.5 | 17.2 | 0.3 | 0.34 |
| 12 | Catapal Al₂O₃ | 186 | — | 6.0 | 0.71 | 99.4 | 67.7 | 27.3 | 5.0 | 0.30 |
| 13 | Catapal Al₂O₃ | 186 | — | 9.0 | 1.10 | 99.6 | 82.3 | 17.7 | 0 | 0.37 |

In interpreting the results shown in the table in qualitative terms, it is clear that H₂S selectivity increases dramatically (while the % acceptance decreases slightly) up to a value for θca of about 1.0. It is equally important to note that for values of θca above 1.0 (greater than one monolayer), there is a tendency for the sulfur retained on the spent acceptor to increase to an unacceptable degree, i.e., high sulfur retention means low acceptance of SO₂ in subsequent cycles. In fact, further runs were conducted (not shown in the table) with low surface area α-alumina (0.1 m²/g) impregnated with 2.0 wt.% Ca, resulting in a θca of about 300, where it was observed that after two cycles of acceptance and reduction, the result was near zero SO₂ acceptance in the third cycle.

Finally tests were run with acceptors comprising BaO on Catapal alumina, BeO on Catapal alumina, and MgO impregnated alumina, in each case with enough oxide to form one monolayer. With the BaO acceptor the acceptance was 100% for up to only two cycles, but with rapid falling off of acceptance in subsequent cycles due to retention of the sulfur. With the BeO acceptor the acceptance of 89.7% was observed, but there appeared to be a very high selectivity for SO₂ during reduction. The MgO impregnated Al₂O₃ showed a very low 75.8% acceptance and 36.2% H₂S selectivity.

The above discussed data clearly leads one to the conclusion that only an acceptor comprising calcium oxide deposited as a single complete monolayer on an alumina or alumina/magnesia support will provide high acceptance as well as high selectivity for H₂S over an extended number of cycles.

I claim as my invention:

1. In a continuous process for removing sulfur oxides from a gas which comprises contacting said gas with an acceptor at acceptance conditions to react said sulfur oxide with said acceptor and thereby retain said sulfur oxide, wherein said retained sulfur oxide is removed from said acceptor by contacting said acceptor with a reducing gas comprising hydrogen at reduction conditions, said acceptor comprising calcium oxide deposited on a support selected from the group consisting of aluminum oxide and a mixture of aluminum oxide and magnesium oxide, the improvement which comprises: depositing said calcium oxide on said support in a monolayer on calcium oxide represented by $$\theta_{ca} = M_{ca}/M_o$$

where $\theta_{ca}$ = fraction of the support surface area convered by said calcium oxide $M_{ca}$ = number of calcium oxide molecules present per unit weight of the support; and, $M_o$ = number of calcium oxide molecules required for said monolayer per unit weight of said support; and where $\theta_{ca}$ is equal to 1.0.

2. The process of claim 1 wherein said acceptance conditions comprise a temperature from about 540° C. to about 760° C.

3. The process of claim 1 wherein said reduction conditions comprise a temperature of at least about 730° C.

4. The process of claim 1 wherein the support comprises aluminum oxide and magnesium oxide with a weight ratio of magnesium oxide to aluminum oxide from about 0.15:1.0 to about 0.50:1.0.

5. The process of claim 1 wherein said gas comprises a flue gas from a fluid catalytic cracking unit regenerator.

6. The process of claim 1 wherein fluidized cracking catalyst is cycled between a cracking zone, in which said catalyst is contacted at an elevated temperature with a sulfur containing hydrocarbon feedstock and wherein sulfur containing coke is deposited on said catalyst, and a regeneration zone, in which carbon and sulfur are oxidized and removed from said catalyst to form said flue gas containing sulfur oxides, said catalyst having particles of said acceptor physically admixed therewith which acceptor reacts with said sulfur oxides to form spent sulfur containing acceptor, said spent acceptor being freed from said sulfur and renewed by withdrawing said acceptor and catalyst from said regeneration zone and treating said acceptor in an acceptor renewal zone by contacting said acceptor with a reducing gas comprising hydrogen at reducing conditions, whereby said sulfur becomes dissociated from said acceptor, and thereafter recirculating said catalyst and acceptor to said cracking zone.

7. The process of claim 6 wherein said acceptor renewal zone comprises a vessel in the dipleg line between the regeneration vessel and the reactor riser.

8. The process of claim 6 wherein said contacting of said acceptor in said acceptor renewal zone is with a mixture of hydrocarbon gas and hydrogen.

* * * * *